US005382036A

United States Patent [19]

Counts et al.

[11] Patent Number: 5,382,036

[45] Date of Patent: Jan. 17, 1995

[54] MOLDED, FIBER-REINFORCED, TUBULAR WHEELCHAIR FRAME ASSEMBLY AND METHOD

[75] Inventors: David M. Counts; Daniel E. Williamson, both of Fresno, Calif.

[73] Assignee: Quickie Designs Inc., Fresno, Calif.

[21] Appl. No.: 893,204

[22] Filed: Jun. 2, 1992

[51] Int. Cl.[6] .................................. B62M 1/14

[52] U.S. Cl. .................... 280/250.1; 280/304.1; 297/DIG. 4

[58] Field of Search ............... 280/250.1, 304.1, 281.1, 280/288.3; 297/DIG. 2, DIG. 4; 428/621, 36.3

[56] References Cited

U.S. PATENT DOCUMENTS

| | | | |
|---|---|---|---|
| 3,612,582 | 10/1971 | Pitner | 403/356 |
| 4,405,142 | 9/1983 | Whetstine | 280/250.1 |
| 4,500,102 | 2/1985 | Haury et al. | 297/DIG. 4 |
| 4,592,562 | 6/1986 | Strautnieks et al. | 297/DIG. 4 |
| 4,592,570 | 6/1986 | Nassiri | 280/250.1 |
| 4,657,795 | 4/1987 | Foret | 280/281.1 |
| 4,900,048 | 2/1990 | Derujinsky | 280/281.1 |
| 5,116,067 | 5/1992 | Johnson | 280/250.1 |
| 5,143,391 | 9/1992 | Robertson et al. | 280/250.1 |
| 5,152,543 | 10/1992 | Sims et al. | 280/250.1 |
| 5,172,925 | 12/1992 | Kendrick | 280/304.1 |

*Primary Examiner*—Margaret A. Focarino

*Assistant Examiner*—Anne Boehler

*Attorney, Agent, or Firm*—Flehr, Hohbach, Test, Albritton & Herbert

[57] ABSTRACT

A wheelchair frame assembly and method including a plurality of hollow frame members (22–26, 28, 29, 31) connected together at joints and having a configuration suitable for use as a wheelchair frame (21). Selected ones of the frame members (23, 24) are formed with bracket mounting sites designed to accommodate bracket mounting clamping assemblies (49, 56) that will not crush the tubular frame members (23, 24). At one bracket mounting site (62), a clamping assembly (49) includes a fastener assembly (73) with a force limiting element (74) that prevents over-clamping of the hollow frame member (23). At another clamping site, a groove (91) is provided which cooperates with a locking pin (108) in the clamping assembly (56) to resist rotation of the clamping assembly (56) about the frame member (24) without the need to create high transverse clamping forces. The number of layers of resin and fiber, the orientation of the fibers in each layer, and the cross section of the frame member at various joints and accessory mounting sites is designed to provide the necessary strength in accordance with the loading at these locations.

1 Claim, 4 Drawing Sheets

MOLDED, FIBER-REINFORCED, TUBULAR WHEELCHAIR FRAME ASSEMBLY AND METHOD

TECHNICAL FIELD

This invention relates, in general, to frame assemblies for wheelchairs and methods for manufacture of the same, and more particularly, relates to tubular, lightweight, wheelchair frame assemblies which are formed by molding and curing fiber and resin matrices.

BACKGROUND ART

During the last ten years, wheelchair frame assemblies have evolved from relatively rectangular, heavy and bulky frames to much more sleek, compact and lightweight frames. Tubular steel frame members have given way to aluminum, and more recently, to molded fiber-reinforced resins, such as graphite/epoxy matrices.

The tendency in the industry to date has been merely to substitute tubular, graphite-reinforced frame members for tubular, aluminum frame members. Thus, the graphite fiber-reinforced technology has primarily been used to reduce the wheelchair weight, with little thought being given as to how molding technology might bring added advantages to wheelchair frame assemblies as compared to metal tube forming technology.

Moreover, the weight-reduction advantages of graphite reinforced wheelchair frames have not been fully realized because of a failure to integrate frame design with accessory attachment. A tubular, graphite-reinforced frame member, for example, will typically have high strength in bending, but will not be capable of withstanding the same radial clamping forces that an aluminum tubular member can withstand. Thus, a conventional mounting bracket for a caster wheel, armrest assembly, etc., can easily crush a graphite frame member before sufficient clamping force would be generated to withstand the torsional or shear loads to which the frame assembly will be subjected.

The solution to this problem in prior art graphite wheelchair frames generally has been to increase the clamping area of the accessory or component mounting bracket. If the clamping area is increased sufficiently, the necessary total clamping force can be generated for the component to be attached to the graphite frame member without crushing the frame member. This approach is effective, but it results in frame clamping assemblies which are larger than would be employed in connection with an aluminum frame. Accordingly, the mounting brackets and frame clamping assemblies in prior art graphite frame wheelchairs have contributed significantly to the overall weight of the wheelchair. Thus, the weight savings gained by the use of graphite/epoxy frames often has been surrendered at least partially back in the form of oversized frame clamping assemblies.

Another problem that has been encountered in connection with graphite wheelchair frames has been the cracking or failure of the frame at joints between intersecting graphite tubular frame portions or members. Again, the goal of saving weight has tended to cause wheelchair frames to be produced from relatively small diameter tubular members. As the diameter of a frame member increases, so will the weight. One of the disadvantages of small diameter tubular frame elements is that the fillets between intersecting frame elements also tend to have relatively small diameters. Since the frame members are molded from high-fiber density graphite layers, and since the fiber themselves are somewhat brittle, small diameter fillets between intersecting joints tend to be very difficult to form. The closely grouped fibers are hard to bend around a small diameter mold surface, making formation of the joints somewhat unreliable and uneven. The result can be that the joints are susceptible to impact-load failures and stress cracking.

Another disadvantage of employing small diameter tubular frame elements is that they are significantly less stiff. This results in an overly flexible frame which substantially offsets the advantage of using materials with a high stiffness to weight ratio.

DISCLOSURE OF INVENTION

Accordingly, it is an object of the present invention to provide a molded, fiber-reinforced, wheelchair frame assembly and method in which the frame assembly is constructed in a manner which enables better utilization of advantages occurring from employing fiber-reinforced molded components.

Another object of the present invention is to provide a graphite wheelchair frame assembly which is designed to enable frame components and accessories to be coupled thereto with mounting assemblies having greatly reduced weight so that the overall wheelchair frame is lighter in weight.

Still another object of the present invention is to provide a graphite/epoxy, tubular, wheelchair frame assembly and method for manufacture of the same which produces a wheelchair frame having greater strength and better resistance to shock or impact loading.

Another object of the present invention is to provide a wheelchair frame assembly which is durable, lightweight, will accommodate various design criteria and can readily include aesthetic structural features.

The wheelchair frame assembly method of the present invention have other objects and features of advantage which will become apparent from, and are set forth in more detail in, the accompanying drawing and following Description of the Best Mode of Carrying Out the Invention.

The lightweight, high-strength wheelchair frame assembly of the present invention comprises, briefly, a plurality of hollow frame members or sections connected together at a plurality of frame joints and having a configuration suitable for use as a wheelchair frame. Selected ones of the frame members are formed with bracket mounting sites for the attachment of components or accessories to the frame. In one aspect of the present invention, such bracket mounting sites have at least one transverse bore extending through the hollow frame member and the bracket is mounted at the site by a fastener assembly which passes through the bore and includes a force limiting device, such as a sleeve, which prevents crushing of the hollow fiber-reinforced frame member at the bracket mounting site. In another aspect of the present invention, the bracket mounting sites include one of a protrusion and recess against which a bracket or clamping assembly can be clamped for loading of the recess or protrusion tangentially of the frame member to enable a reduction in the radio clamping force required to secure the clamping assembly to the frame member against torsional loading. The wheelchair frame assembly also include frame sections formed from a plurality of molded layers of fiber and resin blended between curvilinear transverse cross sections and partially rectilinear transverse cross sections and formed with relatively large diameter fillets connecting intersecting frame sections at joints therebetween. The fiber Orientation throughout the frame assembly has been selected to provide high resistance to the type and direction of loading at the various joints and bracket sites.

In a further aspect of the present invention, methods of securing a clamping or bracket assembly to a hollow wheelchair frame molded from a plurality of fiber-reinforced resin layers are provided. In one aspect, the method includes the step of mounting a clamping assembly to the frame by a clamping shoulder in the clamping assembly which is placed in interengagement with one of a recess or protrusion molded into the frame member for tangential loading of the frame member. In another aspect, the method includes the step of clamping a clamping assembly to the frame member and during the clamping step, limiting the clamping force which can be applied to the frame member to a force less than that required to crush the frame member. Preferably, the limiting step is accomplished by positioning a force limiting element between opposing sides of the clamping assembly.

BEST MODE OF CARRYING OUT THE INVENTION

The formation of tubular molded parts using fiber-reinforced resin matrices is broadly old and does not constitute a novel portion of the present invention. While other fiber-reinforced resins and various reinforcing fibers can be employed, it is preferable that the wheelchair frames of the present invention be formed of layers of uncured epoxy resin having graphite or carbon fibers laid in side-by-side parallel relation in a sheet-like matrix. Layers of high-fiber density graphite/epoxy matrices are commercially available from AKZO Company of Fortafill Fibers, Inc.

Typically, the layers of graphite and epoxy resin are positioned around a molding mandrel, which is thereafter placed into a female mold for the application of heat and pressure to effect curing of the epoxy resin. Alternatively, the resin and fibered layers can be laid-up in a split-female mold having an air-pressurized bladder to create the hollow interior of the frame member. Other schemes for internally pressurizing the layers being molded include the use of expanding a urethane foam inside the hollow interior, and using an inflatable bag with a measured amount of liquid freon, which becomes gaseous during the elevated temperatures of curing.

All of these techniques employ a female mold which applies a pressure to the exterior surface of the layers of resin and fiber being cured, while the layers are supported from their interior by a mandrel, pressurized gas or lightweight foam. Prior to curing the fiber reinforced layers in the mold, the fibers can be manipulated in the sticky, pre-cured resin matrix to conform generally to the mold and its interior support structure.

Figure 1:
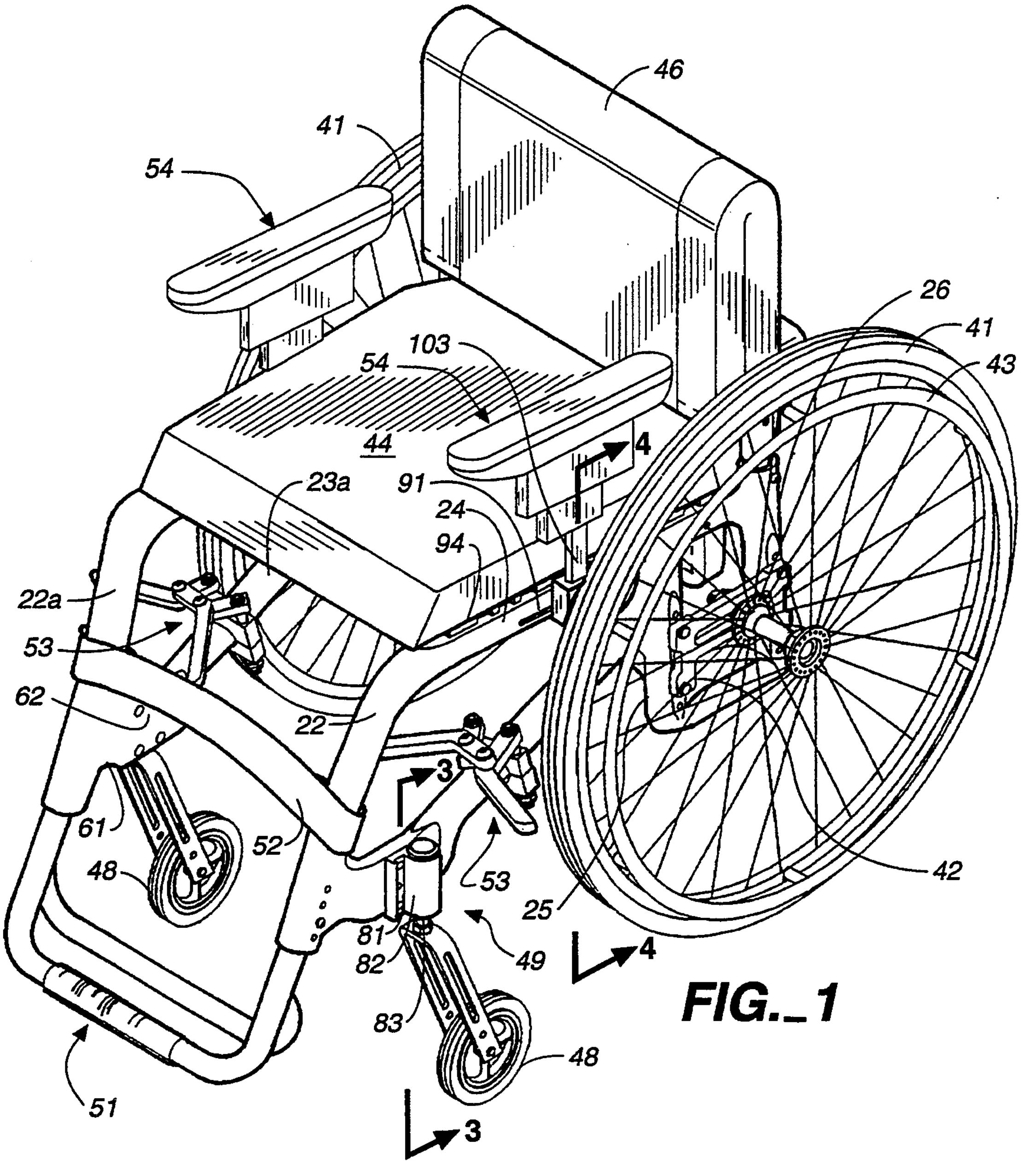
FIG. 1 is a top perspective view of the left side of a wheelchair having a frame assembly constructed in accordance with the present invention.
Figure 2:
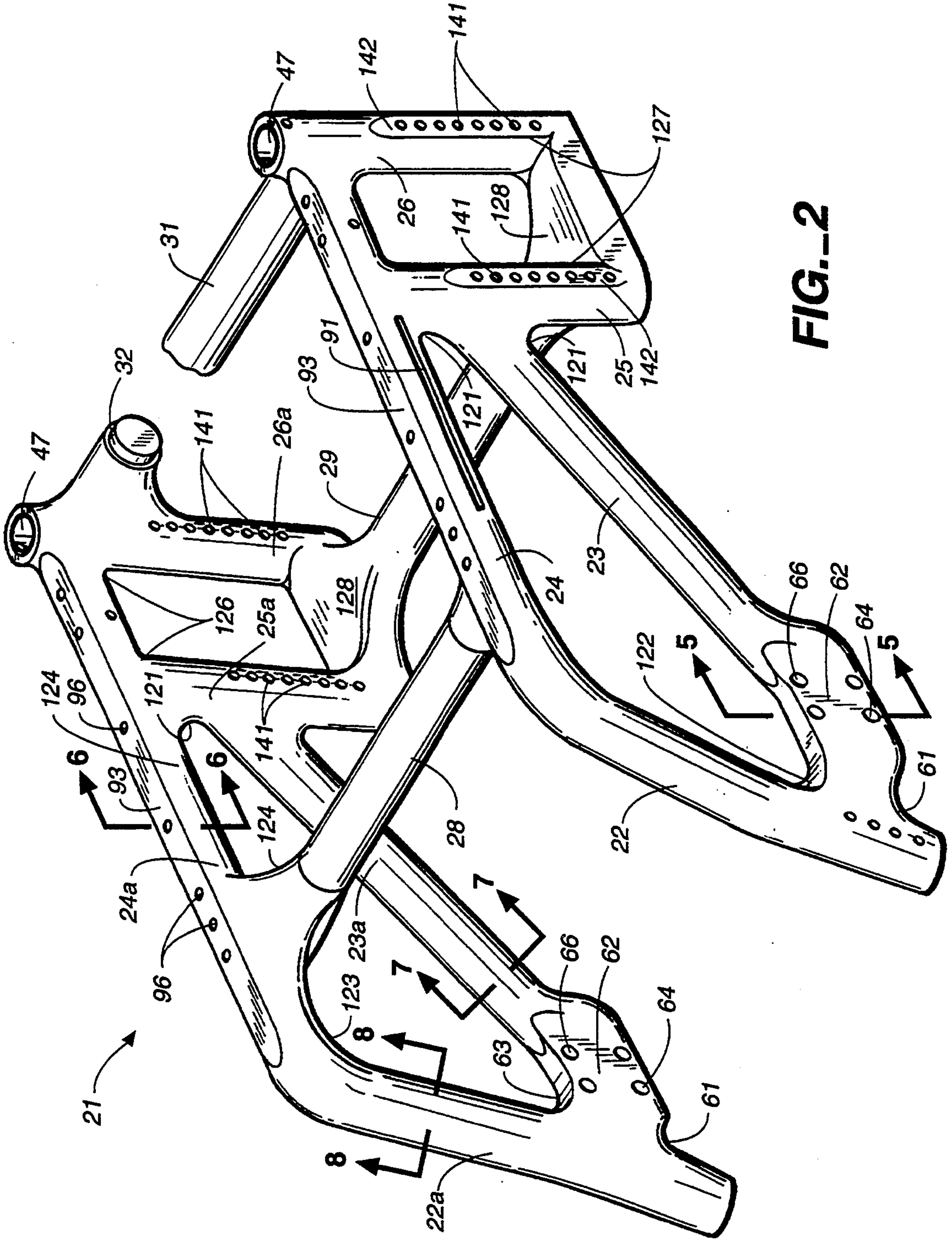
FIG. 2 is an enlarged, top perspective view from the right side of the wheelchair frame assembly of FIG. 1.

Referring now to FIGS. 1 and 2, the lightweight, high-strength, wheelchair frame assembly, generally designated 21, of the present invention can be described in detail. A plurality of hollow frame members or frame sections 22–26 are joined together to form integral molded side frame, namely, the left side of assembly 21. Corresponding frame members *22a–26a* are integrally molded together and form a right side of wheelchair frame 21. Connecting the two side frame assemblies to each other are three transversely extending, tubular frame members 28, 29 and 31, which each preferably have substantially circular cross sections.

In order to couple the side frame members together, they preferably are formed with integrally molded stubs 32 having an external diameter mating with the internal diameter of transverse tubular frame members 28, 29 and 31. An epoxy adhesive such as HYSOL EA9320 may be employed to adhesively bond the transverse frame members to each of the integrally molded, side frame assemblies.

Frame assembly 21 of the present invention will have mounted thereto a plurality of conventional accessories and components necessary to provide a complete wheelchair. Although not exhaustive of the possibilities, the wheelchair formed by frame assembly 21 can be seen from FIG. 1 to be a manual wheelchair having drive wheels 41 mounted by brackets 42 to frame members 25 and 26. A manually grippable drive rim 43 may be provided on each of the drive wheels.

Extending between horizontal frame sections or members 24 and *24a* is a wheelchair seat 44, and seat back 46 can be mounted to chair frame 21 by posts which extend into open upper ends 47 of frame members 26 and *26a*. The front end of the frame assembly may be supported on caster wheels 48 mounted to diagonal frame members 23 and *23a* by caster wheel mounting assemblies, generally designated 49. A footrest assembly 51 can be mounted to the lower open ends of frame members 22 and *22a*, and leg support strap 52 also can be attached between these same front frame members.

Wheel lock devices 53 are shown mounted to diagonal frame members 23 and *23a*, and optionally, armrest assemblies 54 or wheel side guards (not shown) may be secured by mounting brackets 56 to the horizontally extending frame members 24 and *24a*.

Broadly speaking, all of these accessories are well-known in the art. While the wheelchair frame assembly of the present invention is shown as designed for use with a manual wheelchair, it will be understood that a frame assembly constructed in accordance with the present invention can also be employed with powered wheelchairs. Since powered wheelchairs inherently have the substantial additional weight of batteries and motors, however, the advantage of weight reduction in such chairs may be less significant than for manual wheelchairs.

As will be seen, however, a typical wheelchair frame must be able to accommodate or have secured thereto a plurality of components or accessories. Moreover, accessories such as wheel mounts, armrest supports, and wheel locks will undergo substantial dynamic loading, as will all of the joints between the respective frame members or sections. Accordingly, the wheelchair frame assembly of the present invention has been designed specifically to take advantage of the potential of fiber reinforcing molding techniques to solve some of the accessory mounting and joint stress problems.

Figure 3:
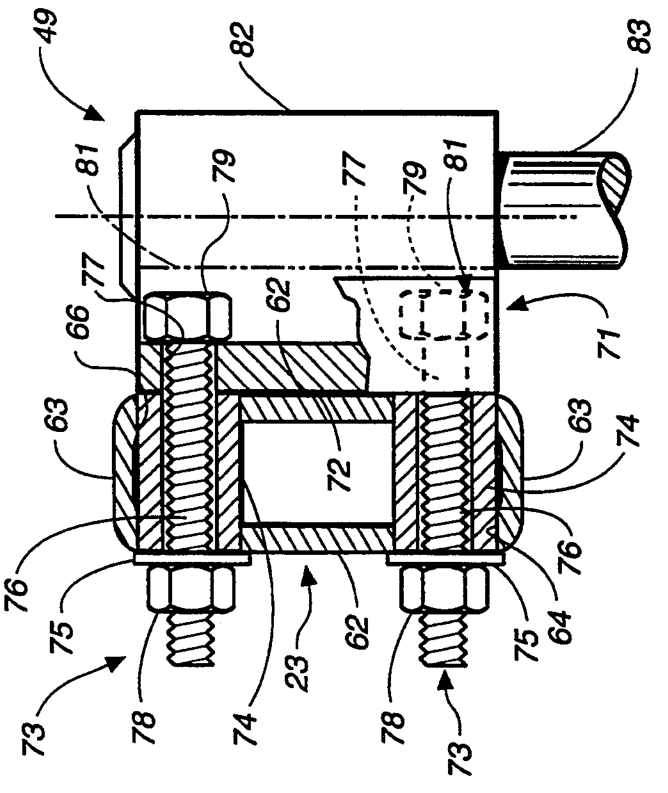
FIG. 3 is an enlarged, fragmentary, cross section view of a caster wheel mounting assembly taken substantially along the plane of line 3—3 in FIG. 1.
Figure 5:
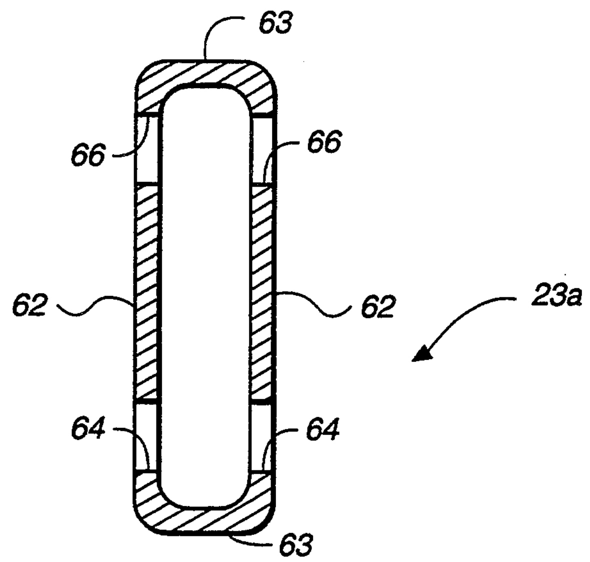
FIGS. 5 through 8 are enlarged, cross section views of frame sections taken substantially along the respective section lines shown in FIG. 2.
Figure 7:
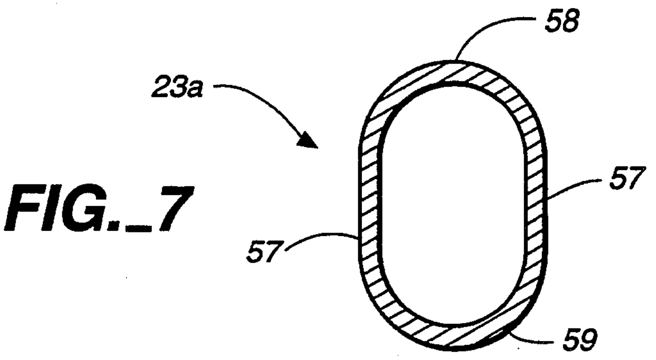

Referring now to FIG. 3, one aspect of the frame assembly of the present invention can be described in detail by examining the construction of caster wheel mounting assemblies 49. The caster wheel mounting assemblies 49 are secured to the lower end of tubular frame members 23 and 23*a*. Frame sections or members 23, 23*a* advantageously may have a somewhat elongated cylindrical, transverse cross section over most of its length, as shown in FIG. 7. The cross section of hollow frame member 23*a* can be seen from FIG. 7 to be comprised of an elongated cylinder with a mid-portion 57 which is planar and opposed ends 58 and 59, which are circular or cylindrical halves. As the frame members 23 and 23*a* approach the lower end and joint 61 (see FIG. 2) with frame members 22, 22*a*, the cross section of the somewhat elongated, cylindrical hollow tubular member can be elongated to a much greater degree to produce the substantially rectilinear cross section shown in FIG. 5. Thus, tubular members 23 and 23*a* at the caster wheel mounting site have opposed planar surfaces 62 of significantly increased height as compared to the cross section of FIG. 7. This additional height provides opposed planar surfaces against which a mounting bracket and fasteners can bear. Moreover, the increased section height of FIG. 5 provides a substantial separation between openings or fastener receiving bores 64 and 66. As will be appreciated, the separation of bores 64 and 66 by reason of the increased height of frame members 23 and 23*a* at the bores provides greater resistance to torsion about the longitudinal center line of the frame members. As will be seen from FIG. 3, the caster amount assembly is mounted to one side of the frame member and accordingly will induce a torque about frame members 23 and 23*a*.

Bearing surface sides 62 are interconnected by arcuate sections 63, and the change in cross section from FIG. 7 to FIG. 5 is accommodated by a blending (gradual easing or expanding of the fiber spacing) of the fiber-reinforced resin matrices during molding of the tubular frame member from one cross section to the other. This capability to blend or change cross section over the length of a frame member or section is employed in the frame assembly of the present invention to facilitate clamping to the frame member by lightweight, and yet strong, caster wheel mounting assemblies 49.

The caster wheel mounting assemblies can advantageously be comprised of bracket means or clamping means 71 mounted in engagement with one of the potential bracket mounting surfaces 62, in this case, the outwardly facing bracket mounting surface. The inner surface 72 of bracket 71 can be seen to have a generally planar surface which will mate with and bear against bracket mounting surface 62 over a substantial area of the tubular frame member so as to distribute the clamping load over the bracket mounting surface more uniformly. Fastener means 73 are coupled to bracket means 71 and apply transverse force to hollow frame member 23, preferably by extending through fastener receiving bores 64 and 66. It will be understood, however, that fastener means could also extend around the upper and lower sides 63 of the fastener member, provided that the fastener assembly also includes a force limiting means mounted to limit the amount of transverse clamping force which can be applied by fastener assembly 73 to hollow tubular frame member 23.

As above indicated, composite fiber-reinforced hollow frame members are not able to withstand the same transverse clamping forces or radially inward forces as can metal tubular frame members. In a metal tubular frame member, the fasteners can bear directly on the frame member, or an adaptive washer, and they can be tensioned to generate relatively high transverse clamping forces. In the frame assembly of the present invention, such an approach will crush the hollow, tubular frame members.

Accordingly, each of fastener assemblies 73 advantageously is provided by a bolt 76 which passes through a bore 77 in bracket 71. Mounted concentrically on each of bolts 76 are the force limiting sleeves 74 having a fixed, known length dimension. The bolt and sleeve assembly is then inserted through each of the fastener receiving bores 64 and 66, and washers 75 are mounted on the outer ends of the fastening bolts. Finally, nuts 78 may be screwed down onto the bolt ends. In the preferred construction, the inner end or heads 79 of bolts 76 are received in a channel defined by outwardly extending flange 81, which is transversely spaced from cylindrical sleeve 82 so as to receive the flats of the bolt heads and prevent rotation of the bolts.

As the nuts 78 are tightened down on bolts 76, they adjust the axial length of the assembly to pull brackets 71 and surface 72 against one mounting bracket surface 62. As will be seen, however, sleeves 74 have a fixed length dimension which causes one end of the sleeves to engage bracket surface 72 around bore 77 and the opposite end of the sleeve to engage washers 75 positioned under nuts 78. Thus, the nuts can pull bracket 71 down against surface 62 and washers 75 down against oppositely facing surface 62, but as the nuts tighten on bolts 76, the washers and bracket begin to engage and be supported by sleeves 74. The transverse clamping force between bracket 71 and washers 75 on frame member 23, therefore, is effectively limited, and the nuts can be tightened without fear of over-tightening or crushing hollow frame member 23.

In the preferred form, hollow frame member 23 will have a transverse dimension between opposed surfaces 62 of about 0.80 inches, and sleeves 74 will have a transverse dimension of about 0.78 inches. This ensures that there will be a slight interference fit that produces or applies a clamping force to member 23, but the transverse clamping force on the hollow frame member will be effectively limited by sleeves 74.

The force limiting sleeves 74 also perform the function of increasing the diameter which bears against the bores 64 and 66 so as to support the vertical or shear load on member 23 over a greater area. As will be seen from FIG. 2, a plurality of sets of bores 64, 66 can be provided to enable securement of bracket 49 to frame 21 at either one of two positions. This allows adjustment of the frame handling characteristics to the individual user.

As also will be seen from FIG. 3, bracket assembly 71 further includes a generally cylindrical sleeve portion 82 which receives the upper end of caster wheel post 83, and the construction of such posts and post-receiving sleeves is well-known in the wheelchair art.

As will be seen from FIGS. 1 and 3, therefore, bracket assembly 49 can be a relatively small and light-weight bracket assembly which will effectively couple a component or accessory, caster wheels 48, to the wheelchair frame without sacrificing back all the weight gain achieved by using a molded, fiber-reinforced, tubular frame.

An additional advantage of the non-circular cross section of FIG. 5 is that the opposed planar surfaces will eliminate any tendency of the mounting bracket to rotate about the frame member. When mounting brackets are employed which grip around the outside of tubular frames, an anti-rotation pin sometimes must be provided through the frame to prevent rotation. This, of course, further increases the clamping assembly weight.

Figure 4:
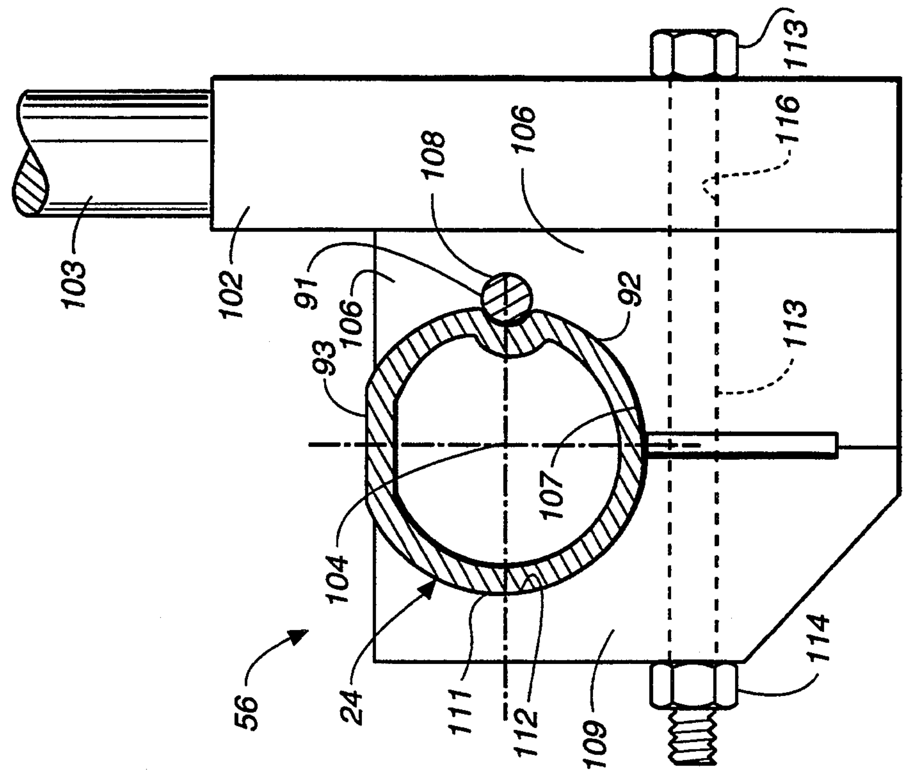
FIG. 4 is an enlarged, fragmentary, cross section view of an armrest mounting bracket taken substantially along the plane of line 4—4 in FIG. 1.
Figure 6:
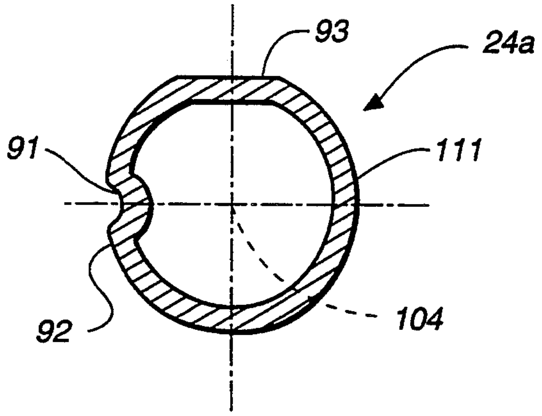

In another aspect of the present frame assembly, mounting of wheelchair accessories or components to the frame assembly is accomplished by molding one of a recess or protrusion in the exterior surface of the tubular frame member. As can be seen in FIGS. 4 and 6, tubular frame members 24 and **24*a* have a generally cylindrical cross section, but they are formed with a longitudinally extending groove or recess 91 in one of the laterally facing exterior sides, preferably the outwardly facing sides 92. The top surface 93 of frame members 24, 24*a* may be planar surfaces so that seat mounting brackets 94 (see FIG. 1) can be used to secure seat 44 to frame members 24, 24*a*. A plurality of fastener receiving openings 96 are provided for receipt of fasteners used to couple of the seat mounting brackets 94 to the frame members. The length of flat upper surface 93 of frame member 94, plus the plurality of openings 96 which can be arranged along frame members 24, 24*a***, result in the fastening load for the seat being relatively low or easy to distribute along the tubular frame members. Accordingly, force limiting sleeve assemblies are not normally required to secure the seat to the frame.

Armrest assemblies 54, however, must support substantial downward loading or torsion about frame members 24, **24*a*. Wheelchair users often have to lift themselves on and off a wheelchair using the armrests and when seated on seat 44, use armrests 54 to periodically shift their weight. Armrests 54 are most preferably coupled to the wheelchair frame at a single location, rather than by means of a longitudinally extending clamping assembly which would spread the loading forces, but also would add substantial weight. Accordingly, as best may be seen in FIG. 4, a clamping assembly or bracket 56 for support of an armrest receiver 102 from a side of frame member 24 is provided. Armrest post 103 extends into receiver 102** and is releasably coupled thereto, in a manner well-known in the industry.

In order to resist the high torsional loading around frame member 24, the exterior surface of tubular frame member is molded with one of a recess or protrusion therein. As above indicated, it is preferable to provide a recess 91, which extends longitudinally along longitudinal axis 104 of the frame member. Moreover, for maximum resistance to torsional loading, groove 91 is advantageously positioned in surface 92 proximate the intersection of a horizontal plane passing through axis 104 with surface 92. Clamping assembly 56 is formed to cooperatively interengage the recess or protrusion formed in the tubular frame member. In this case, clamping assembly 101 includes a clamping member 106 formed with a semi-cylindrical surface 107 which mates with the exterior side surface 92 of frame member 24. A shoulder means or protrusion is provided in surface 107 by a longitudinally extending or elongate pin or dowel 108 mounted to bracket member 106 and extending outwardly so as to engage and substantially mate with longitudinally extending recess 91.

A second clamping member 109 can engage an opposite side 111 of tubular frame member 24 and has a mating semi-cylindrical surface 112, which together with surface 107 forms a frame engaging channel that distributes the clamping force over the sides of the tubular frame member. Fasteners, such as a pair of side-by-side bolts 113, pass through bores 116 in receiver 102 and extend through the two clamping members. Nuts 114 are threadably mounted on the bolts and used to pull the clamping assembly down against the opposed sides of frame member 24. As the clamping assembly is clamped in place, the pin or dowel 108 seats in frame member groove 91 to effectively lock the clamping assembly against rotation about longitudinal axis 104. Moreover, and very importantly, the transverse clamping force on the assembly does not have to be sufficiently high to be capable of preventing rotation about axis 104 through frictional engagement of the clamping members 106 and 109 with the opposed frame member surfaces. The groove 91 and pin 108, in effect, transmit torsional forces about axis 104 into tangential forces on frame member 24. This makes it possible for clamping assembly 56 to withstand substantial downward loading of the armrests without requiring a clamping force that would be high enough to crush the tubular frame member 24.

As will be appreciated, a reversal of parts is possible in clamping assembly 56 of the present invention since molding of tubular frame member 24 could also be accomplished by providing a longitudinally extending ridge, which mates with a longitudinally extending recess in clamping assembly member 106.

As will be seen in FIG. 4, the clamping members 106 and 109 preferably do not extend up above the planar seat support surface 93 so that the armrest brackets can be clamped underneath frame members 24 by a pair of side-by-side fastening bolts 113 which extend only beneath frame member 24. The clamping members 106 and 109 must extend sufficiently far around the periphery of the frame member 24 so as to effectively trap or enclose enough of the frame member circumference so that locking pin or dowel 108 will be held in recess 91. The effectiveness of using the groove and pin construction of assembly 56 to support the substantial downward axial loading, in fact, is illustrated by the ability to use fasteners on only the bottom side of the frame members.

Another feature of providing a recess 91 which extends longitudinally of member 24 and forming frame member 24 of a substantially uniform cross section along groove 91 is that clamping assembly 56 can be loosely attached to frame member 24 by fasteners 113, and then assembly 56 can be adjusted along groove 91 to the desired position for the individual user. The fasteners 113 then may be tensioned to clamp the assembly to the frame member in the desired longitudinal location.

From the above description of the frame assembly of the present invention, the method of securing a clamping assembly to a hollow wheelchair frame of the present invention can be seen to include the steps of molding a hollow frame member from a plurality of fiber-reinforced resin layers, positioning clamping means in engagement with the frame member and clamping the clamping means to the frame member.

In one aspect of the method of the present invention during the clamping step, the step is taken of limiting the clamping force which can be applied by the clamping means to the frame member to be a transverse clamping force less than the force required to crush the frame member.

In another aspect of the present invention, the method of securing a clamping assembly is comprised of, during the molding step, molding the frame member with one of a recess and a protrusion in an exterior surface of the frame member. Moreover, during the positioning step, the method includes the step of mounting a clamping assembly to the frame member by a clamping shoulder means, such as longitudinally extending pin 108, which is positioned in interengagement with one of the molded recess and protrusion in the frame member for tangential loading of the frame member to resist rotation about the longitudinal axis of the frame member.

Attachment of drive wheel mounting assemblies 41 can be accomplished by means of fasteners which extend through bores 141 in frame members 25 and 26. Clamping force limiting sleeves could be used in bores 141, but such use has not been found to be required. The clamping forces can be distributed on planar load bearing surfaces 142 on two frame members, with two bolts on each of frame member 25 and 26.

Wheel lock assemblies 53 may be clamped to frame members 23, **23*a* using a conventional tube-clamp which clamps the somewhat elongated cross section of the frame members with a clamping force oriented along a vertical plane. The clamping forces needed to secure the wheel lock assemblies 53, however, is relatively low, and in the area of attachment of assembly 53, the fibers molded in the frame members 23, 23*a*** can be oriented to extend circumferentially to provide additional hoop stress resistance.

One of the substantial advantages which can be realized when wheelchair frames are formed from molded fiber and resin materials is that a combination of the transverse cross section, the number of layers of fiber and resin, and the fiber orientation can be used to provide high resistance to the type and direction of loading at the frame joints and accessory mounting sites. Moreover, the ability to blend from curvilinear transverse frame cross sections to rectilinear transverse frame cross sections is enhanced if the fibers do not have to be bent around relatively small radii of curvature. Thus, the frame members in the wheelchair frame assembly 21 of the present invention are formed with relatively large diameters, and the joints between intersecting frame members similarly are provided with fillets having radii of curvature which are preferably relatively large, namely, at least 9/16 inches in radius.

Referring now to FIG. 2, typical frame joint fillet dimensions can be described. Joints 121 between the upper end of frame member 23 and vertical frame post section 25 are preferably about 0.5 inches. The lower end of member 23 is joined to frame member 22 at joint 122 by radius of curvature of 1 inch. The upper end of member 22 has a radius of curvature at joint 123 with member 24 of 3.3 inches. The radius of curvature at 124 between transverse tubular frame member 28 and longitudinally extending frame members 24 and **24*a* can be 2 inches. At joints 126, between vertical posts 25 and 26 and horizontal frame member 24, have a radius of curvature of 1 inch. Only at joints 127 is the radius of curvature less than ½ inch, and this structure results from the layout of fibers at joints 127, which fibers do not extend upwardly into the posts 25 and 26. The triangular frame areas 128, which are joined by transverse tubular frame member 29** are most preferably formed by using a foamed urethane inside the resin and fiber-reinforced layers to pressurize this section of the frame. The urethane foam is lightweight and it is left in the frame after curing of the resin.

The frame members 22–26 typically will have a characteristic diameter of 1 inch or 1.38 inches and the cross members 28, 29 and 31 similarly have diameters of 1.38 inches. The pre-impregnated sheets or matrices used to form the layers of resin and fiber which are molded to form the frame assembly of the present invention have fiber bundles that are very dense. Accordingly, the large diameter fillets and blending between various cross sections will accommodate even spreading of the fibers around fillets at the various joints and orienting of the fibers in a variety of orientations to best withstand the stress loading of the frame.

Figure 8:
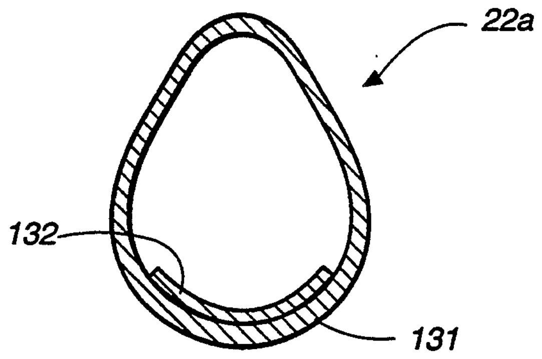

Thus, at the mounting site 62 for caster wheel bracket assembly 49, the frame assembly preferably has eight to twelve layers of resin and fiber laminating together with alternating layers oriented at about 45° from either side of a vertical transverse plane such as section plane 5—5. The alternating 45° orientation of layers of fiber-reinforced resins provides high bearing strength on surfaces 62. As above set forth, frame members 23, **23*a* preferably are formed with fibers extending circumferentially for high hoop strength at the wheel lock attachment areas. The front of frame portions 22 and 22*a* in the area of the cross section of FIG. 8 preferably have isotropic fibers, namely, layers with fibers oriented in virtually all directions, to withstand impact loading from the frame bumping into objects. As can be seen in FIG. 8, frame members 22 also can have a front portion 131 which is reinforced by additional layers 132 where impact is known to occur. If a typical frame member is formed from six to eight laminated layers of fiber-reinforced resin, the front of frame members 22, 22*a*** can be formed of twice as many layers with an isotropic orientation of the fibers and an egg-shaped cross section for resistance against impact and twisting.

In areas such as those to which seat 44 of the wheelchair is attached, or rear drive wheel brackets 42, the chair preferably has alternating layers of fibers at 45° angles on opposite sides of a vertical plane. In structural areas subjected to bending, the frame member preferably is formed from layers of resin having fibers oriented to extend longitudinally along the frame member.

The area defining recess 91 preferably is formed with ten to twelve layers of fiber and resin, and the fibers are oriented at about 45° to the recess axis with alternating layers extending at 45° on either side of the groove.

As will be seen, therefore, the frame assembly of the present invention takes advantage of the ability to mold and orient the fiber reinforcing in the resin matrix, with the fibers oriented in a manner which cooperates with the cross section of the frame member. Moreovers the cross section of the frame member can vary from curvilinear to rectilinear, as may be required or desirable to accommodate joints and component mounting sites. The frame is designed with relatively large diameter or transverse cross sections and fillets at the respective joints so that the fibers can be blended and oriented as required for strength. Multiple layers of fibers also can be used at the stress points and eliminated in areas of less stress.

The result is a wheelchair frame assembly which has high strength, good resistance to twisting or torsion of the overall frame, and is designed to accommodate connection of components thereto by lightweight mounting brackets and frame clamping assemblies.

What is claimed is:

1. A lightweight, high-strength wheelchair frame assembly comprising:

a plurality of hollow frame sections connected together at a plurality of frame joints and having a configuration suitable for use as a wheelchair frame assembly, at least one of said frame sections being formed with a bracket mounting site therein including a planar mounting surface, said frame sections intermediate said bracket mounting site having generally curvilinear transverse cross sections and at said bracket mounting site having at least a partially rectilinear transverse cross section;

one of said frame sections being molded with one of a recess and a protrusion in an exterior surface thereof, said one of said recess and said protrusion being located and oriented for interengagement thereof by a clamping assembly having a mating one of a recess and a protrusion in a manner resisting relative rotation of said clamping assembly about said frame section, said clamping assembly being mountable to said frame section with said clamping assembly extending around a major portion of said frame section and applying a clamping force thereto;

said frame sections being formed from a plurality of molded layers of fiber and resin, said layers of fiber and resin being blended between said curvilinear transverse cross sections and said partially rectilinear transverse cross sections and being formed with relatively large diameter fillets connecting said frame sections at said joints; and said frame sections at said joints and said site having a combination of a transverse cross section, a number of layers, and a fiber orientation providing high resistance to the type and direction of loading of said frame assembly at said joints and said site.

* * * * *

UNITED STATES PATENT AND TRADEMARK OFFICE

CERTIFICATE OF CORRECTION

PATENT NO. : 5,382,036

DATED : January 17, 1995

INVENTOR(S) : David M. Counts, et al.

It is certified that error appears in the above-indentified patent and that said Letters Patent is hereby corrected as shown below:

Column 11, line 20, Claim 1, after "sections" delete "intermediate said bracket mounting site"

Signed and Sealed this

Second Day of May, 1995

Attest:

Bruce Lehman

BRUCE LEHMAN

*Attesting Officer*

*Commissioner of Patents and Trademarks*